(12) United States Patent
Volkmer et al.

(10) Patent No.: US 8,782,631 B2
(45) Date of Patent: Jul. 15, 2014

(54) COPY MANAGEMENT OF PROCESS VERSIONS OVER LIFECYCLE

(71) Applicant: SAP AG, Walldorf (DE)

(72) Inventors: Michael Volkmer, Heidelberg (DE); Martin Naumann, Walldorf (DE)

(73) Assignee: SAP AG, Walldorf (DE)

( * ) Notice: Subject to any disclaimer, the term of this patent is extended or adjusted under 35 U.S.C. 154(b) by 132 days.

(21) Appl. No.: 13/622,951

(22) Filed: Sep. 19, 2012

(65) Prior Publication Data

US 2014/0082601 A1 Mar. 20, 2014

(51) Int. Cl.
*G06F 9/44* (2006.01)

(52) U.S. Cl.
CPC ...................................... *G06F 8/70* (2013.01)
USPC ........................................................ 717/170

(58) Field of Classification Search
CPC .......................................................... G06F 8/70
USPC .......................................................... 717/170
See application file for complete search history.

(56) References Cited

U.S. PATENT DOCUMENTS

| | | | | |
|---|---|---|---|---|
| 5,794,236 A * | 8/1998 | Mehrle | ................................... | 1/1 |
| 5,899,996 A * | 5/1999 | Dysart et al. | ................... | 707/800 |
| 5,915,253 A * | 6/1999 | Christiansen | ........................ | 1/1 |
| 6,694,328 B1 * | 2/2004 | Bennett | ................................ | 1/1 |
| 8,229,579 B2 * | 7/2012 | Eldridge et al. | ................. | 700/31 |
| 2008/0148248 A1 * | 6/2008 | Volkmer et al. | ................ | 717/168 |
| 2008/0235663 A1 * | 9/2008 | Volkmer | ....................... | 717/120 |
| 2010/0138454 A1 * | 6/2010 | Volkmer | ....................... | 707/803 |

\* cited by examiner

*Primary Examiner* — Qing Chen
*Assistant Examiner* — Clint A Thatcher
(74) *Attorney, Agent, or Firm* — Fountainhead Law Group PC

(57) ABSTRACT

Structural information of a process is stored as an instance hierarchy (e.g. parent-child relation) between occurrence nodes comprising occurrence identifications (IDs) and links to objects of an object pool. Efficient management of process versions (e.g. design, build, test, productive, archive) is accomplished by handling occurrences and corresponding linked objects so that a minimum set of data is physically copied. An algorithm governing the physical copying of process data, is described.

18 Claims, 12 Drawing Sheets

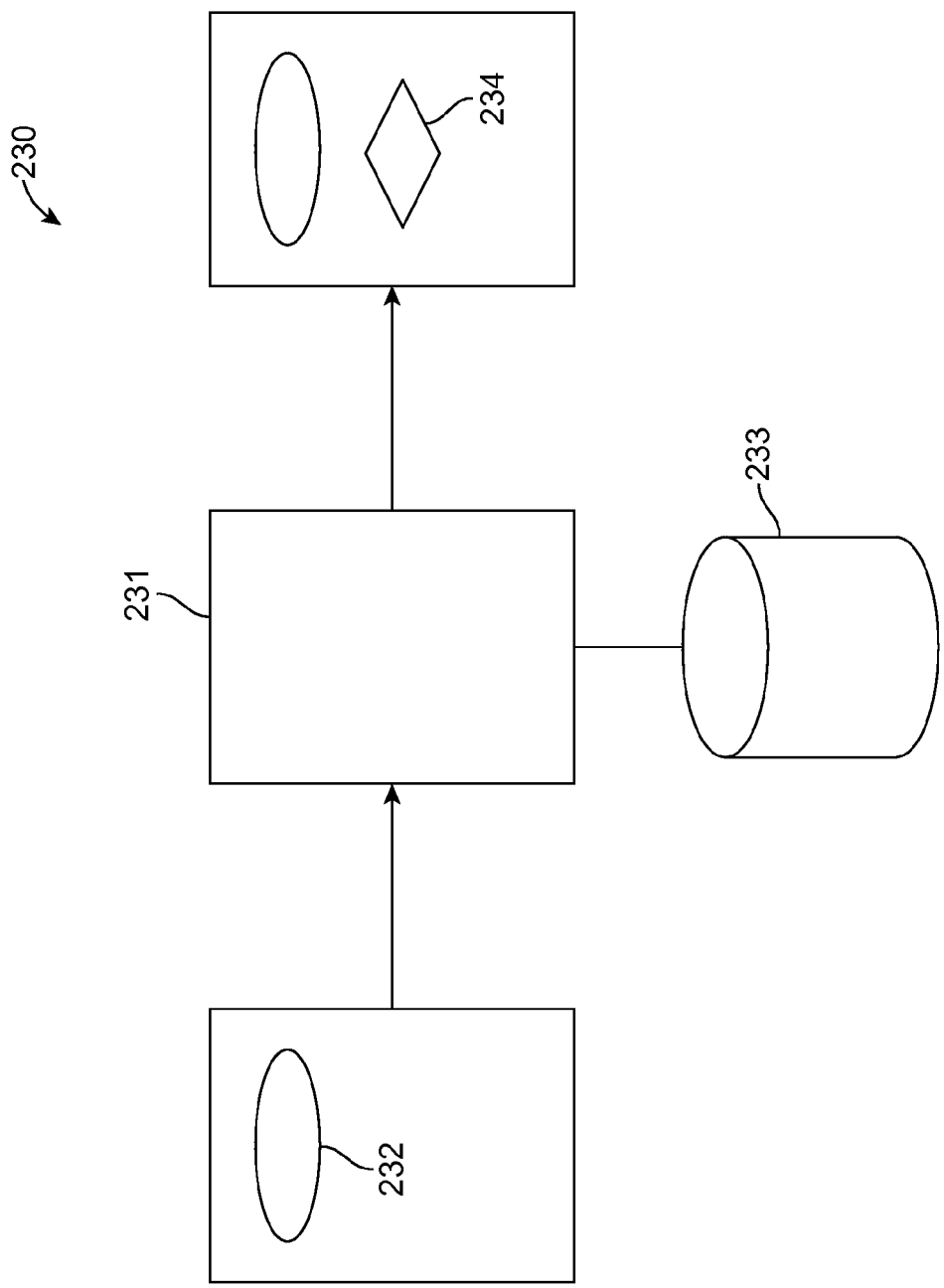

COPY MANAGEMENT OF PROCESS VERSIONS OVER LIFECYCLE

BACKGROUND

Embodiments of the present invention relate to management of process versions over their lifecycles.

Unless otherwise indicated herein, the approaches described in this section are not prior art to the claims in this application and are not admitted to be prior art by inclusion in this section.

Certain platforms may be provided for management of business processes that are supported by different business solutions. Examples of such solutions include but are not limited to Enterprise Resource Planning (ERP) and Customer Relations Management (CRM).

The processes may exhibit a lifecycle. For example, the processes may first be designed based on business requirements, resulting in a "design" version of the process. Next, the processes may be implemented in specific software via customization, resulting in a "build" version of the process.

The processes may then be tested, resulting in a "test" version of the process. Finally, the processes may be deployed into production for operation, resulting in a "productive" version of the process.

Over the course of the lifecycle of a process, it may be desirable to change different versions independently from each other. For example, it may be desirable to modify a "design" version of a process without impacting a "productive" version of the process.

Conventionally, in managing different process versions, copies of the corresponding objects making up the process may be made. However, the data comprising such corresponding objects may be quite voluminous.

Given that a significant portion of the data of the object may not need to be changed (e.g. where no changes are necessary within a new version), the conventional approach may result in unnecessary manipulation of large volumes of data, and consuming processing and storage resources. This may also be true for management of the archive process versions used for comparison and merging operations.

Accordingly, the present disclosure addresses these and other issues with methods and systems relating to efficient management of process versions.

SUMMARY

Structural information of a process is stored as an instance hierarchy (e.g. parent-child relation) between occurrence nodes comprising occurrence identifications (IDs) and links to objects of an object pool. Efficient management of process versions (e.g. design, build, test, productive, archive) is accomplished by handling occurrences and corresponding linked objects so that a minimum set of data is physically copied. An algorithm governing the physical copying of process data, is described.

An embodiment of a computer-implemented method comprises causing an engine to receive a first process version comprising an instance hierarchy comprising a plurality of nodes referencing objects of an object pool. The engine is caused to create a copy of at least a portion of the instance hierarchy. The engine is caused to create a copy of at least one object of the object pool. The engine is caused to create a modified object from the copy. The engine is caused to modify the portion of the instance hierarchy to reference the modified object and create a second process version.

An embodiment of a non-transitory computer readable storage medium embodies a computer program for performing a method comprising causing an engine to receive a first process version comprising an instance hierarchy comprising a plurality of nodes referencing objects of an object pool. The method further comprises causing the engine to create a copy of at least a portion of the instance hierarchy. The method further comprises causing the engine to create a copy of at least one object of the object pool. The method further comprises causing the engine to create a modified object from the copy. The method further comprises causing the engine to modify the portion of the instance hierarchy to reference the modified object and create a second process version.

An embodiment of a computer system comprises one or more processors and a software program executable on said computer system. The software program is configured to cause an engine to receive a first process version comprising an instance hierarchy comprising a plurality of nodes referencing objects of an object pool. The software program is configured to cause the engine to create a copy of at least a portion of the instance hierarchy. The software program is configured to cause the engine to create a copy of at least one object of the object pool. The software program is configured to cause the engine to create a modified object from the copy. The software program is configured to cause the engine to modify the portion of the instance hierarchy to reference the modified object and create a second process version.

In certain embodiments the nodes of the instance hierarchy are arranged in a parent-child relationship, and copying of the instance hierarchy preserves the parent-child relationship.

According to some embodiments at least one node of the first process version, and at least one node of the second process version, reference a global object of the object pool.

In particular embodiments the first process version comprises an archive version including an archive table, and copying of the instance hierarchy creates additional entries in the archive table and creates an origin matrix.

Various embodiments may further comprise causing the engine to delete a node from the copy of the instance hierarchy.

According to certain embodiments the instance hierarchy comprises a tree structure.

The following detailed description and accompanying drawings provide a better understanding of the nature and advantages of particular embodiments.

BRIEF DESCRIPTION OF THE DRAWINGS

FIG. 2 shows a simplified view of an embodiment of a system for process version management.

DETAILED DESCRIPTION

Described herein are techniques for management of process versions over their lifecycle. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
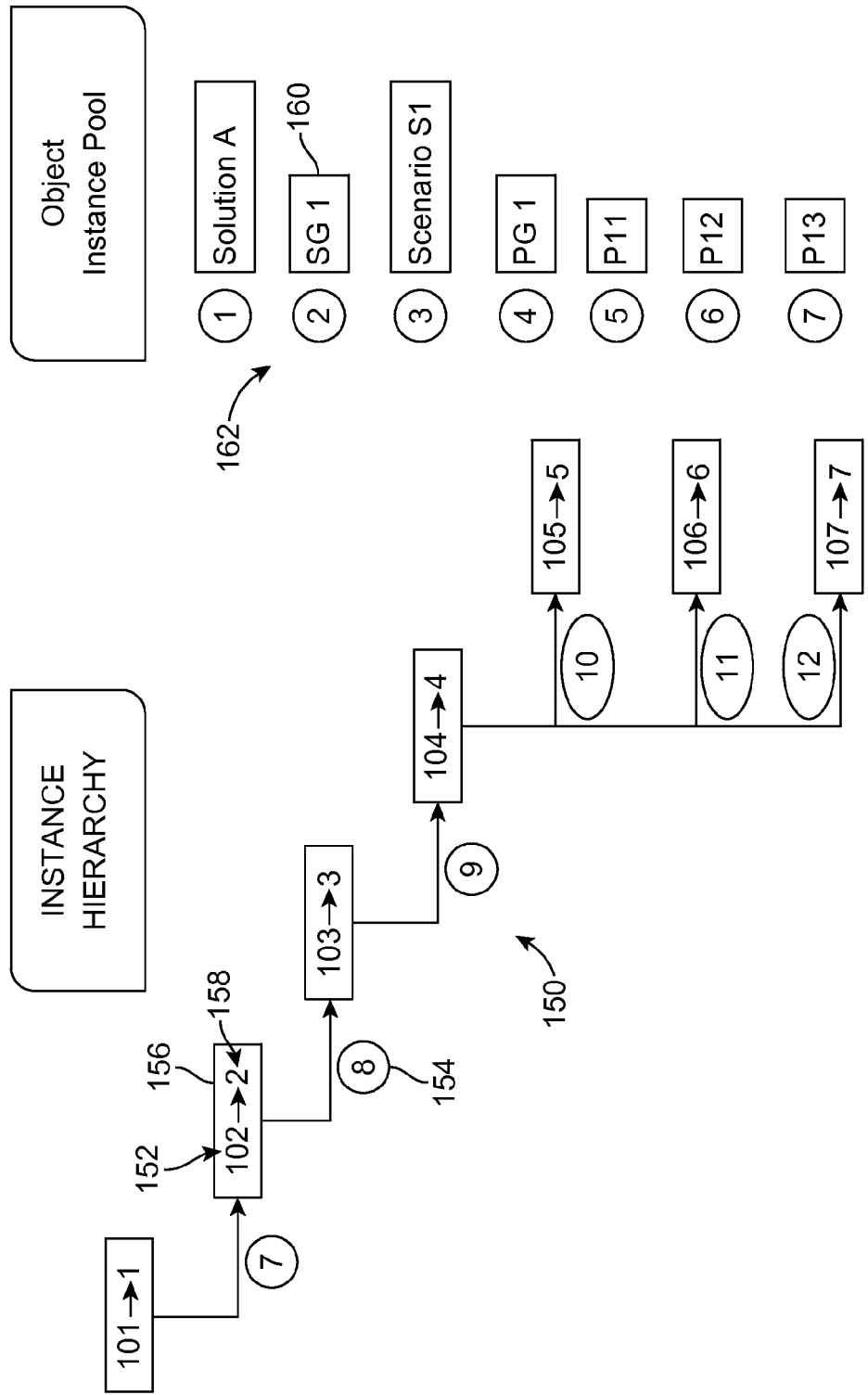
FIG. 1 shows a simplified view of an instance hierarchy and an object instance pool.

FIG. 1 shows a simplified view of an instance hierarchy and an object instance pool used to store process structure information. Here, structural information (e.g. that a process comprises process steps) is stored in a hierarchy 150 comprising occurrence IDs 152 and hierarchical relations 154 between the occurrence IDs. Such a hierarchy is called an instance hierarchy.

Each node 156 in the instance hierarchy has an ID (e.g. 102). The hierarchical relation is stored as a parent-child relation between the occurrence nodes (e.g. 8 indicates that node 102 is the parent of node 103.

In addition, each occurrence node carries a link 158 to an object 160 stored in an object pool 162. Here, for example, occurrence node 102 has a link to the object 2 {ScenarioGroup (SG) 1}.

Objects stored in the pool can be modeled as "global objects", also referred to herein as "global pool objects". Global pool objects are not copied in the object pool.

Global pool objects are identified by a set of key attributes (semantic key). These global pool objects offer an additional mechanism to reuse certain objects and their data (attributes) if this is semantically possible or necessary. In this manner, the use of global pool objects can limit a number of necessary copy procedures.

Data (attributes) are stored together with the objects in the object pool, so that an occurrence node does not have any additional data. Thus in FIG. 1, the text of occurrence 101 can be fetched from object 1. This text is "Solution A".

Instance/occurrence attributes can be used for attributes that from a semantic perspective, are to be copied directly. For example, a process may have a status value to be initialized directly after the copy. Such a status value may be defined as an "instance" or "occurrence" attribute.

FIG. 2 shows a simplified view of a system for process version management according to an embodiment. System 230 comprises an engine 231 that is configured to receive as input, an existing process version 232. As shown and described in FIG. 1, the existing process version 232 comprises an instance hierarchy and an object instance pool.

Upon receipt of the existing process version, the engine is configured to reference a plurality of instructions in the form of computer code stored in a non-transitory computer readable storage medium 233. Based upon these instructions, engine 231 is configured to operate to create a new process version 234.

In particular, the engine is configured to first make a copy of the instance hierarchy of the original process version, preserving the nodes and their hierarchical relation to one another. Next, the engine is configured to modify relevant nodes of this copied hierarchy, in order to reference new object instances that have been added to the pool. Details of operation of the engine are now further described below in connection with FIG. 2A.

Figure 2A:
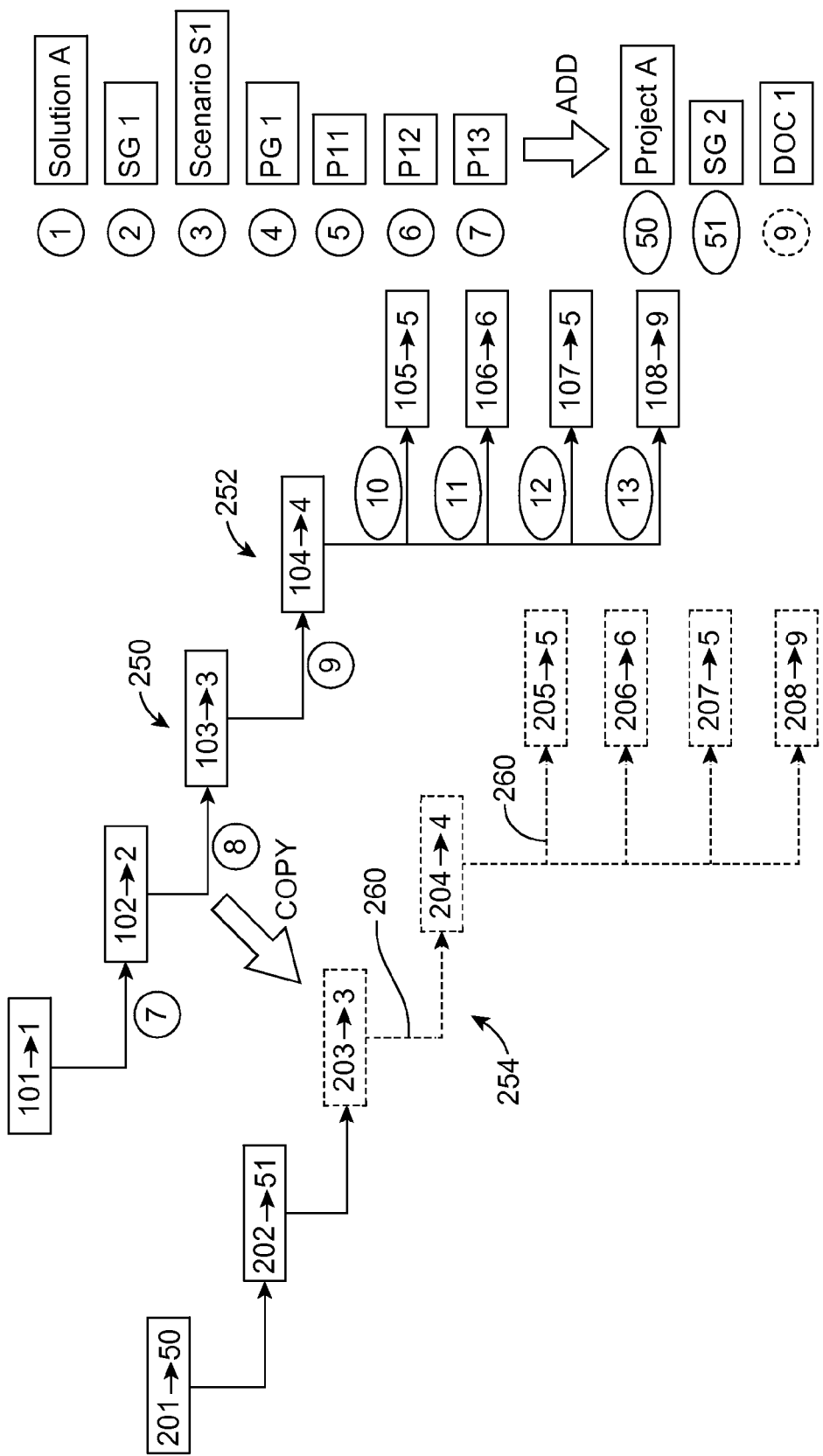
FIG. 2A is a simplified diagram showing an embodiment of process version management utilizing an instance hierarchy and an object instance pool.

Specifically, FIG. 2A is a simplified diagram showing an embodiment of process version management utilizing an instance hierarchy and an object instance pool. In particular, an existing process version comprises instance hierarchy 250.

A new process version may be sought to be created from this existing version. Creation of this new process version with a different sub-tree, may be accomplished in the following manner.

First, for occurrences of the original sub-tree 252, new occurrence IDs 254 are created. Each such new occurrence ID, points to the same object ID as the corresponding original occurrence ID. For each occurrence relation in the original, new occurrence relations are defined to represent copies of the parent-child relations of the original.

Thus in the example of FIG. 2A, occurrence 103 (Scenario 1) is copied along with its complete sub-tree to Project A, where it is a child node of occurrence 202. Thus for the original occurrence nodes 103-108, new occurrences (203-208) are created having a reference to the same object IDs (3-6, 9). Also the parent-child relations are copied as shown by the dashed arrows 260.

This procedure outlined above will enhance efficiency of the copy function. This is true even if large sub-trees are to be copied, since only the minimum set of data is copied.

Figure 2B:
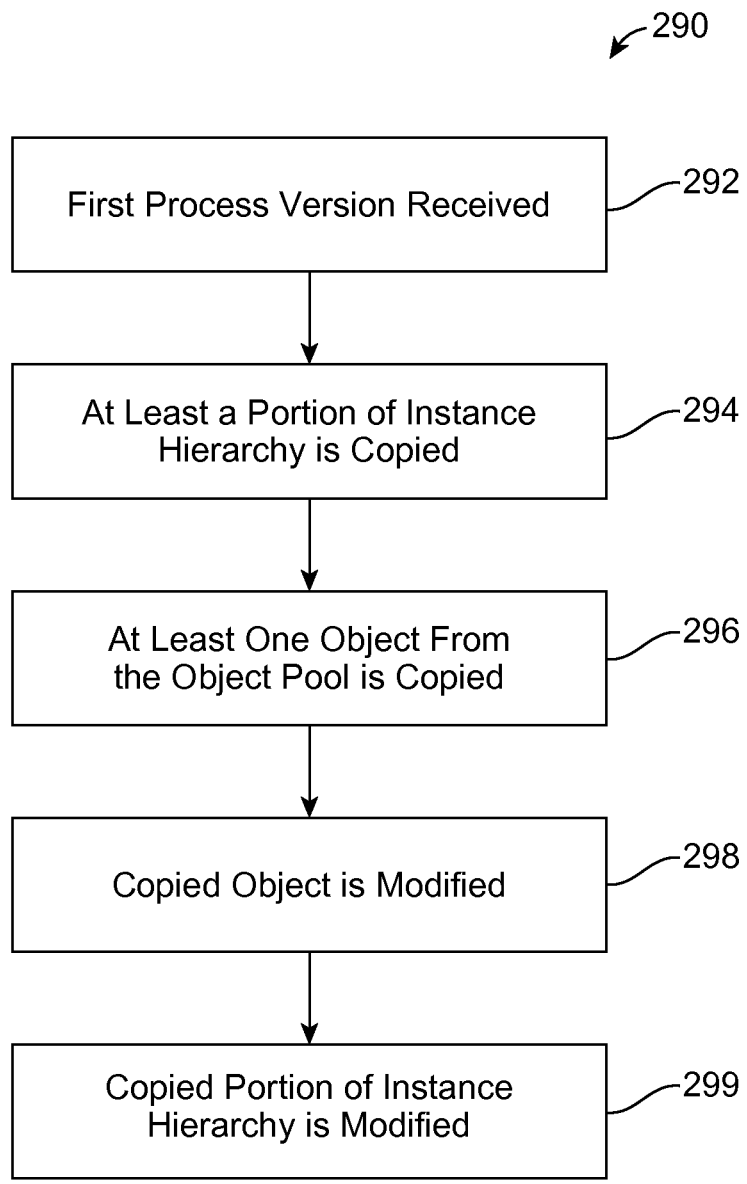
FIG. 2B is a simplified diagram showing a process flow according to an embodiment.

FIG. 2B is a simplified diagram showing a process flow 290 according to an embodiment. In step 292 of the process flow, an engine receives a first process version comprising an instance hierarchy comprising a plurality of nodes referencing objects of an object pool. In step 294, the engine creates a copy of at least a portion of the instance hierarchy. In step 296, the engine creates a copy of at least one object of the object pool. In step 298 the engine creates a modified object from the copy. In step 299 the engine modifies the portion of the instance hierarchy to reference the modified object and create a second process version.

The process flow shown in FIG. 2B represents just one embodiment. According to various alternative embodiments, various steps can be omitted, added, or performed in a different order.

In order to maintain two independent versions (e.g. original, new) of the process for the user, the following steps may be taken so that changes done in the context of one occurrence (version) are valid and visible for this occurrence (version), and not for other occurrences (versions) that reference the same objects of the object pool. This can be accomplished as is now described in connection with FIG. 3.

Figure 3:
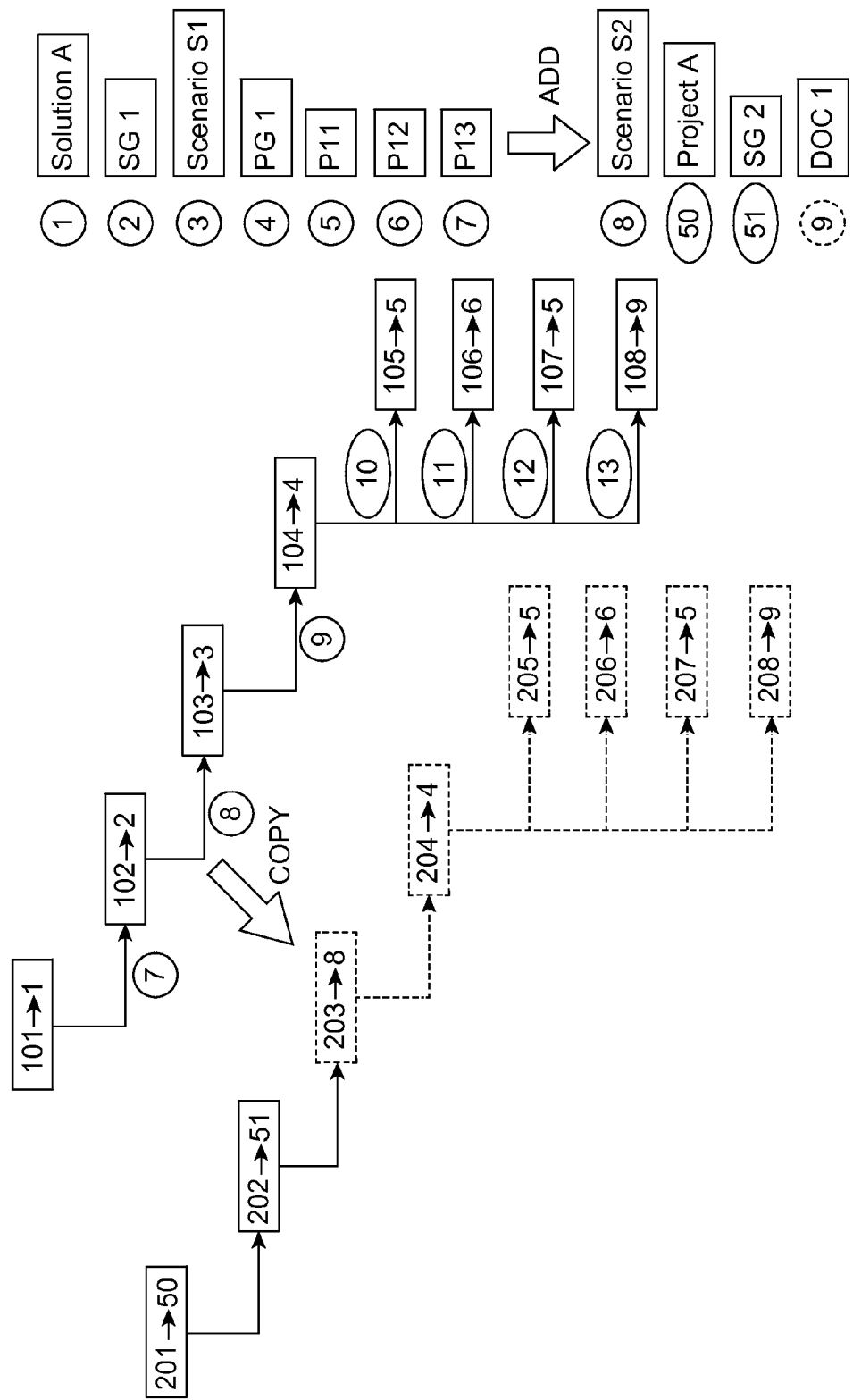
FIG. 3 is a simplified diagram showing an embodiment of process version management utilizing an instance hierarchy and an object instance pool.

FIG. 3 is a simplified diagram showing an embodiment of process version management of an attribute of a non-global pool object. In this FIG. 3, the description of a scenario is changed.

The description of a non-global pool object is accessed in the context of the instance hierarchy. Thus, an occurrence ID is known (e.g. change the description of the object 3 via occurrence 203).

It is checked whether the pool object is referenced by other occurrences. If the pool object is not referenced by other occurrences, the description of the pool object can be changed.

If the pool object is referenced by other occurrences (e.g. pool object 3 is also used by occurrence 103), then a copy of the pool object is made. Thus in FIG. 3, for example object 3 is copied to object 8 with all attribute values.

The reference from occurrence 203 is changed to the new pool object. Thus in the FIG. 3, the occurrence 203 now points to 8 instead of 3.

The description of the new pool object can be changed. Thus in the FIG. 3, the description of pool object 8 is "Scenario S2".

Figure 4:
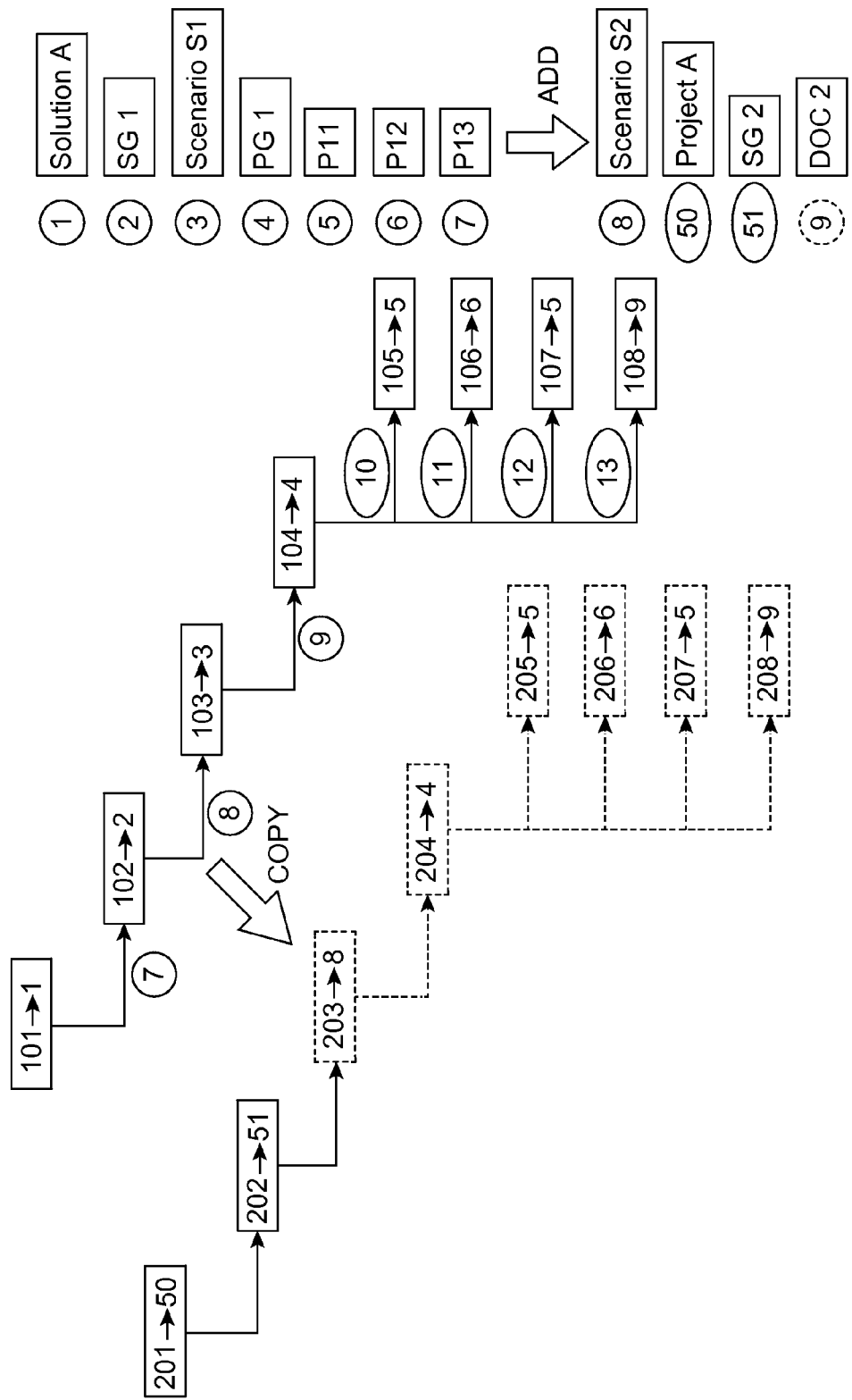
FIG. 4 is a simplified diagram showing an embodiment of process version management utilizing an instance hierarchy and an object instance pool.

FIG. 4 is a simplified diagram showing an embodiment of process version management changing an attribute of a global pool object. In this figure, the description of a document is changed.

As mentioned previously, global pool objects (e.g. object 9 referenced by occurrence ID 108 and 208) in FIG. 3 are not copied, even if the object is referenced by more than one occurrence. Rather, attributes of such a global pool object can be changed directly via an occurrence, without the need to create a copy of the pool object.

In this manner the corresponding changes are valid (and visible) for all occurrences having a reference to the pool object, so that it is not necessary to copy global pool objects. Also, the calculation of whether more than one occurrence uses the pool object, is obviated.

In FIG. 3 and FIG. 4, the global pool object having the ID 9 is used by occurrence 108 and 208. If attributes of that global pool object (ID 9) are changed, it is not necessary to check whether the pool object is used by more than one occurrence.

Instead, the attributes (e.g. the description) can be changed without any additional check. As a result FIG. 4 shows that both occurrences (108 and 208) still reference the same pool object (ID 9), but both occurrences will show the new description "DOC 2".

Example 1

An example of process version management is now provided in the context of the Solution Manager Unified Directory (SMUD) platform available from SAP AG, which manages business processes that are supported by various solutions supported by SAP AG. Examples of such solutions include but are not limited to SAP Enterprise Resource Planning (ERP), and SAP Customer Relationship Management (CRM).

Figure 5:
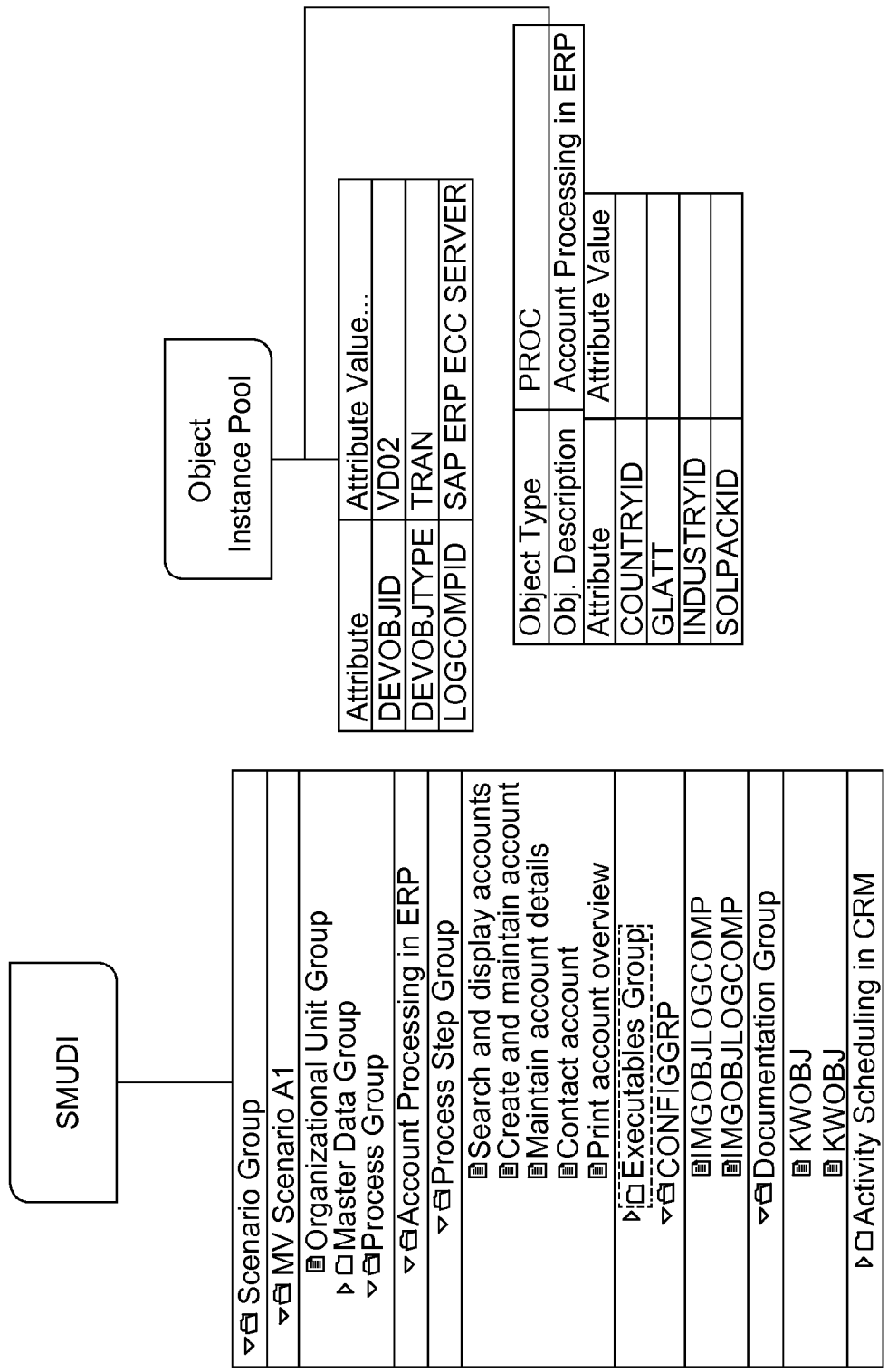
FIG. 5 is a simplified diagram showing an example of process version management according to an embodiment.

FIG. 5 is a simplified diagram showing an example of process version management according to an embodiment. FIG. 5 shows a sample process hierarchy and some objects of the object pool.

The FIG. 5 illustrates that attributes like description, country and industry of a process, are derived from the object of the object pool. These attributes can be visualized in the occurrence hierarchy.

This may be done in the following manner. For each occurrence in the hierarchy, the description is read from the referenced object of the object pool. The parent child relation is read from the instance hierarchy forming the SMUD instance (SMUDI) displayed on the left side.

An application may show this as a tree structure. If a node in the tree is selected, it would be possible to fetch and display further attributes from the attributes pool for this node, for example a list of associated countries for a process.

The object pool is transparent to the end user, and is used for performance and data handling reasons. Access to objects stored in the pool is through the occurrence node of the instance hierarchy structure, so that for operations (e.g. change, delete, relocate, etc.), an occurrence context is available.

Thus, the root node of a SMUDI can be seen in FIG. 5 as a representative of the complete occurrence tree, since this is the anchor point for a SMUDI.

Returning to FIG. 4, it may be noted that changes to the instance hierarchy structure (e.g. adding a new child node to occurrence node 204) do not have the same impact on the object pool and the references by the occurrence nodes to the object pool. In this case, only a new pool object and a new occurrence are created.

However, such a change may have an impact on the archive process versions. These versions of the process are used on the origin matrix of the occurrences employed for the compare functionality.

An origin matrix is available for nodes in the instance hierarchy. The origin matrix is used to compare and merge two versions of the same object.

The origin matrix may carry one entry for each possible version with the following information:

a predecessor occurrence ID that represent the predecessor version;

an archive version ID that represents the version at the point in time when it was created (copied) from the predecessor.

Thus, the entries in the origin matrix also use the instance hierarchy and the object pool. These are taken onto account, if changes are done in the instance hierarchy or the object pool.

If an occurrence is copied in the manner just described, the predecessor occurrence ID and an archive version of the occurrence sub-tree, are stored in the origin matrix. Since the archive is initially identical to the source and target of the sub-tree, it is not necessary to make a physical copy of the sub-tree for the archive. Therefore, the occurrence ID of the copy (target occurrence ID) is used as a pointer to the archive.

This can be viewed as a temporary archive, since in general archive versions are stored in a separate table as they do not represent productive data. Such an approach can result in the versioning archiving being lean. However, it may call for additional care if the sub-tree being used as a temporary archive is changed.

Figure 6:
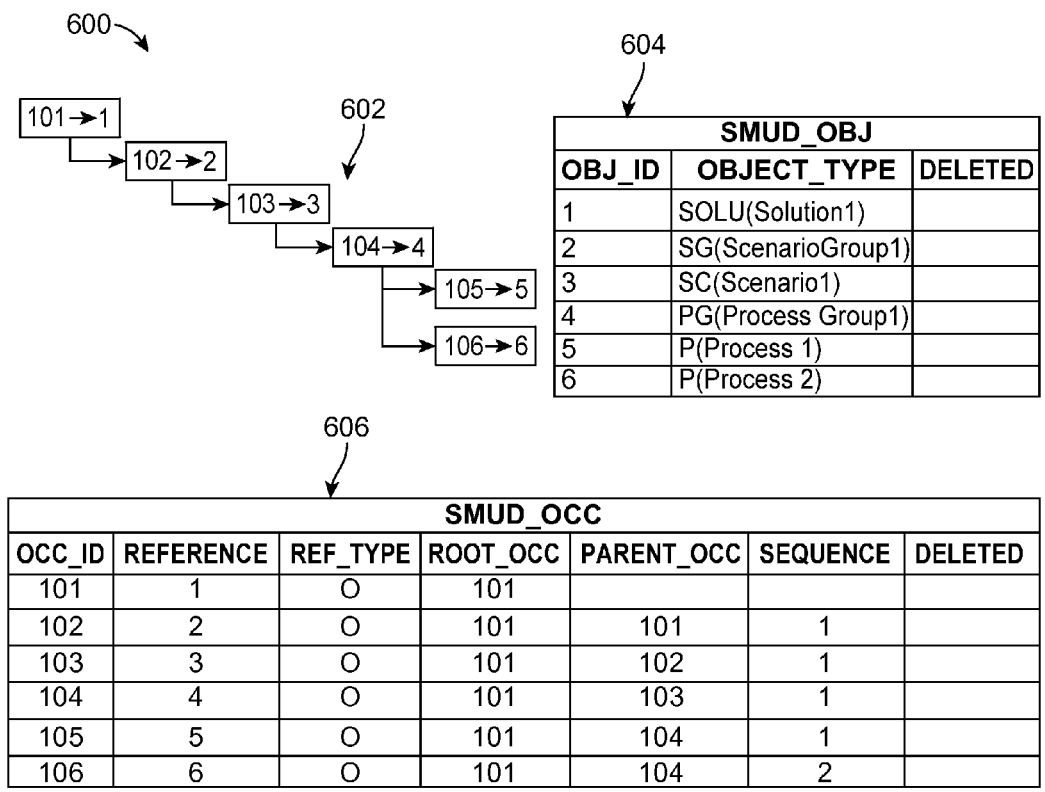
FIG. 6 is a simplified diagram showing an example of process version management according to an embodiment.
Figure 7:
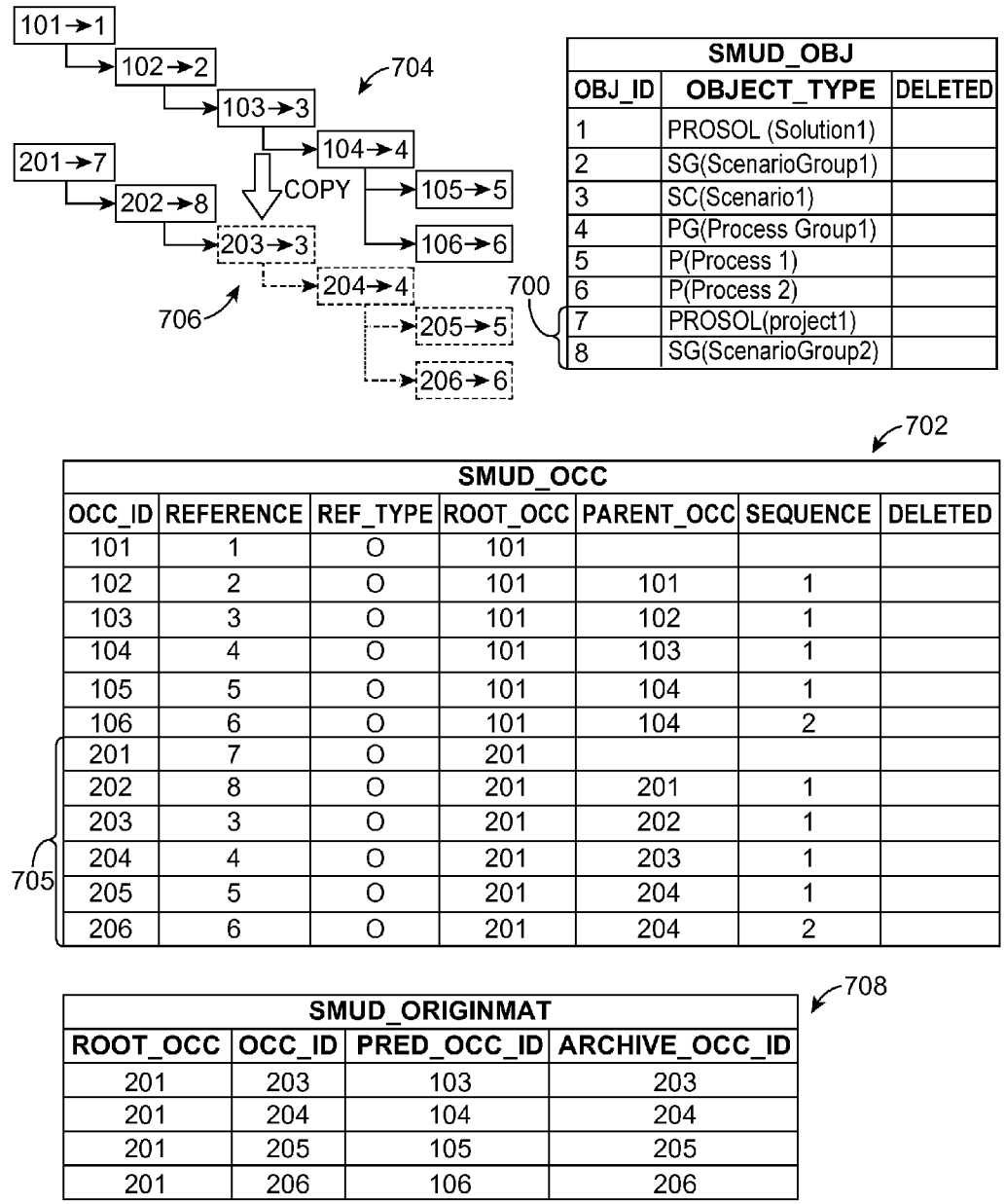
FIG. 7 is a simplified diagram showing an example of process version management according to an embodiment.
Figure 8:
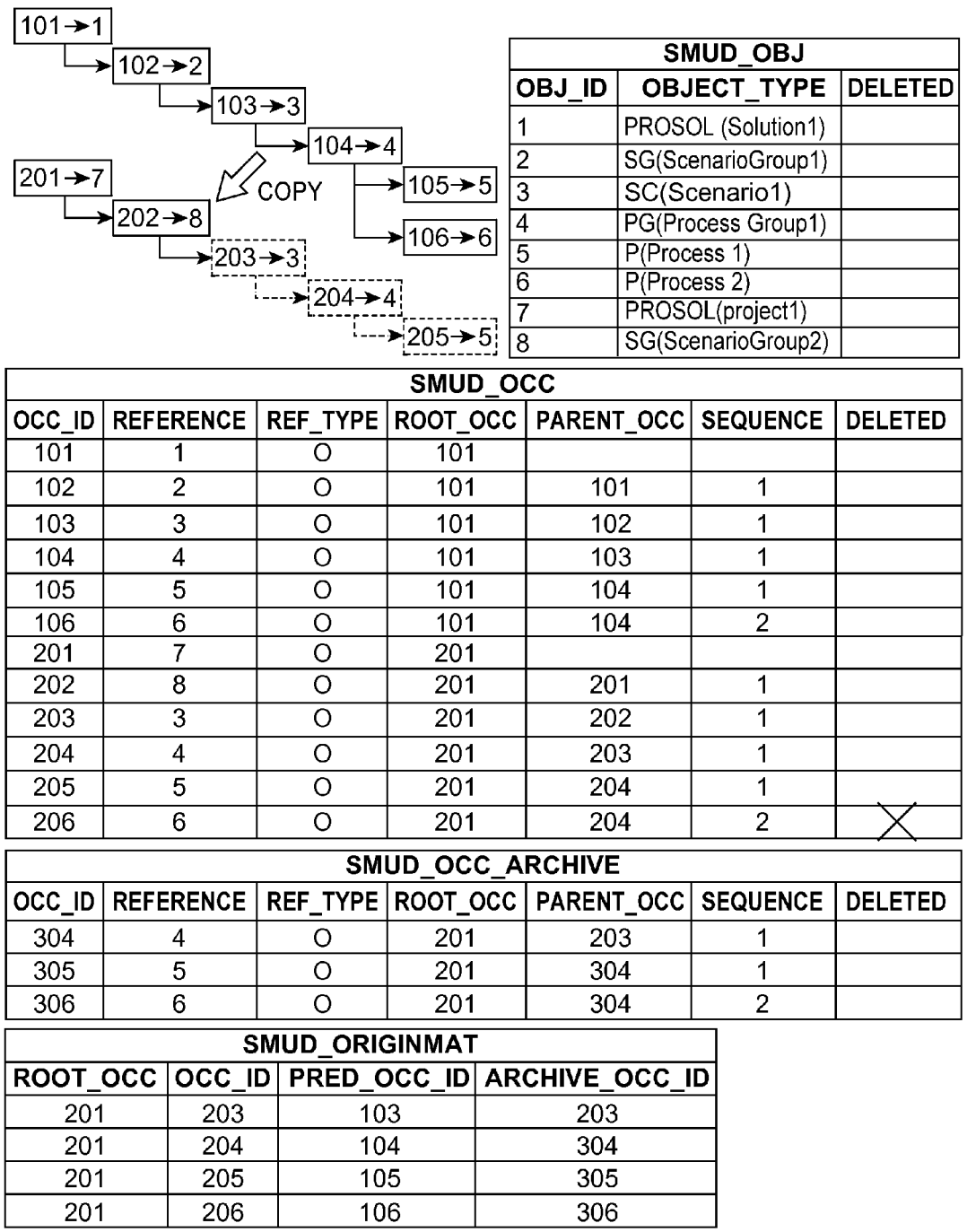
FIG. 8 is a simplified diagram showing an example of process version management according to an embodiment.

FIGS. 6-8 are simplified diagrams illustrating in the SMUD environment, the impact of process version management on archive occurrences. In particular, FIG. 6 shows an original process version 600 including an instance hierarchy 602 representing "Solution1", and an object instance pool 604 (Pool object table SMUD_OBJ), and an archive table 606.

Under some circumstances, it may be desirable to perform the operation of adding or deleting a child occurrence for a parent occurrence of this process version. FIG. 7 specifically shows the addition of a new process to the process group PG 1 in Project A. In particular, FIG. 7 shows creation of a new project "project1" that leads to additional entries 700 in the table SMUD_OBJ.

FIG. 7 shows a new instance hierarchy (201→202) to which "Scenario1" (103) is copied to 203. This results in two versions of "Scenario1": one in SMUDI 101, and one in SMUDI 201.

This is not necessarily the same instance hierarchy as shown in previous figures. It is a simplified version to make the sample tables smaller.

If the Scenario1 is copied to this project1, the occurrence table 702 is filled accordingly with new entries 705. The two occurrence trees 704, 706 now look as shown.

In addition, the copy of "Scenario1" triggers the creation of origin matrix entries. This is shown in 708 with predecessor and archive entries (203-206) for "Scenario1" in the context of SMUDI 201.

Structure maintenance is done in the context of a SMUDI, so that the parent occurrence ID (which is 204 for PG1 in Project A) for the new (or to be deleted) occurrence is known. It is checked whether the parent occurrence (204) is used as an archive occurrence. If not, the child can be added or deleted.

Now the structure of one version of "Scenario1" is changed. In the example, "Process 2" is deleted from "Scenario1" in the context of "project1". This means the following in the instance hierarchy: occurrence 206 is deleted along with its relation to parent node 204.

If the parent occurrence is used as an archive occurrence, a copy of the parent occurrence and its sub-tree is made and stored in the archive tables with a new occurrence IDs (e.g. 304-306). The archive entries for parent occurrence (204) and its children have to be exchanged with new archive occurrences (304-306). The child for occurrence (204) can be added (deleted).

Thus, project1 contains now a new version of Scenario1. This is represented via the 203-206 in table SMUD_OCC—specifically, by the "deleted" flag (X) in line 206.

As described above, initially the occurrence sub-tree of the target SMUDI (203-206) are used as archive occurrence IDs. FIG. 8 is a simplified diagram showing an example of process version management involving the deletion of Process 2 from Scenario1 in project1.

This means that occurrence 206 is deleted. The above algorithm for structure changes is applied.

Specifically, the parent node of occurrence 206 is occurrence 204. It is checked if parent occurrence 204 is used as an archive. This is done by checking entries of column ARCHIVE_OCC_ID in the table SMUD_ORIGINMAT. The origin matrix in FIG. 8 now allows a comparison that shows that "process 2" was deleted in the context of SMUDI 201.

Since 204 is used, new archive occurrences are generated for 204 and its sub-nodes 205 and 206 in the table SMUD_OCC_ARCHIVE.

Process version copy management according to various embodiments may exhibit one or more characteristics. For example, in some embodiments each new version of a process structure shall behave as a copy of the predecessor version for the end user. To avoid making a #deep copy#, only so-called occurrences and relation between these occurrences are copied. The occurrences and relations comprise IDs, and relations between the IDs. The #real# data (attribute values, documents, #) are not copied physically.

Archive versions for offering lifecycle management (e.g. compare and merge) of a version, may be created physically if necessary, via a "late archiving" mechanism.

A copy algorithm ensures that physical copies are only made, if they are really necessary due to changes to one of the versions.

If a new version of a process hierarchy and its related content is needed because a design version is transferred into a test version or a new release version has to be created; only a minimum set of data is physically copied. If changes are performed on a version, an algorithm checks which part of the data needs to be copied due to the changes.

The copy handling is to be seen in the context of lifecycle and release management of SMUD in Solution Managers since it ascertains effective data handling in this context.

The new approach utilizes the differentiation of occurrences and (global and non-global) objects for an efficient copy handling and includes lifecycle management data-like archiving in its concept.

Figure 9:
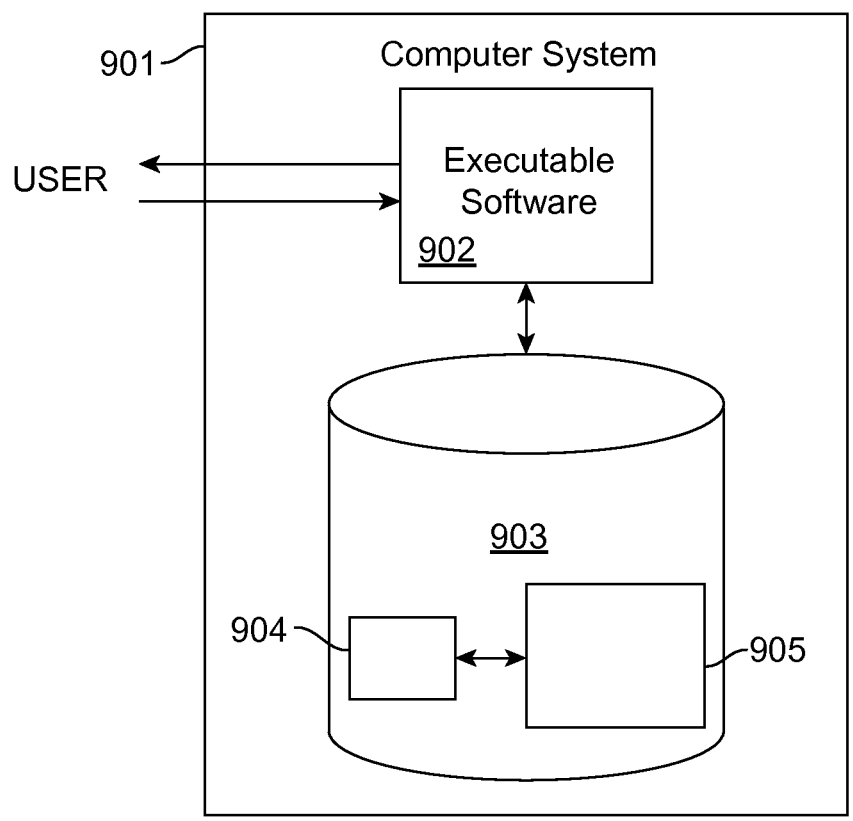
FIG. 9 illustrates hardware of a special purpose computing machine configured to perform copy management according to an embodiment.

FIG. 9 illustrates hardware of a special purpose computing machine configured to perform copy management according to an embodiment. In particular, computer system 900 comprises a processor 902 that is in electronic communication with a non-transitory computer-readable storage medium 903. This computer-readable storage medium has stored thereon code 905 corresponding to an engine. Code 904 corresponds to instructions for causing the engine to receive a first process version, and to create a second process version therefrom. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
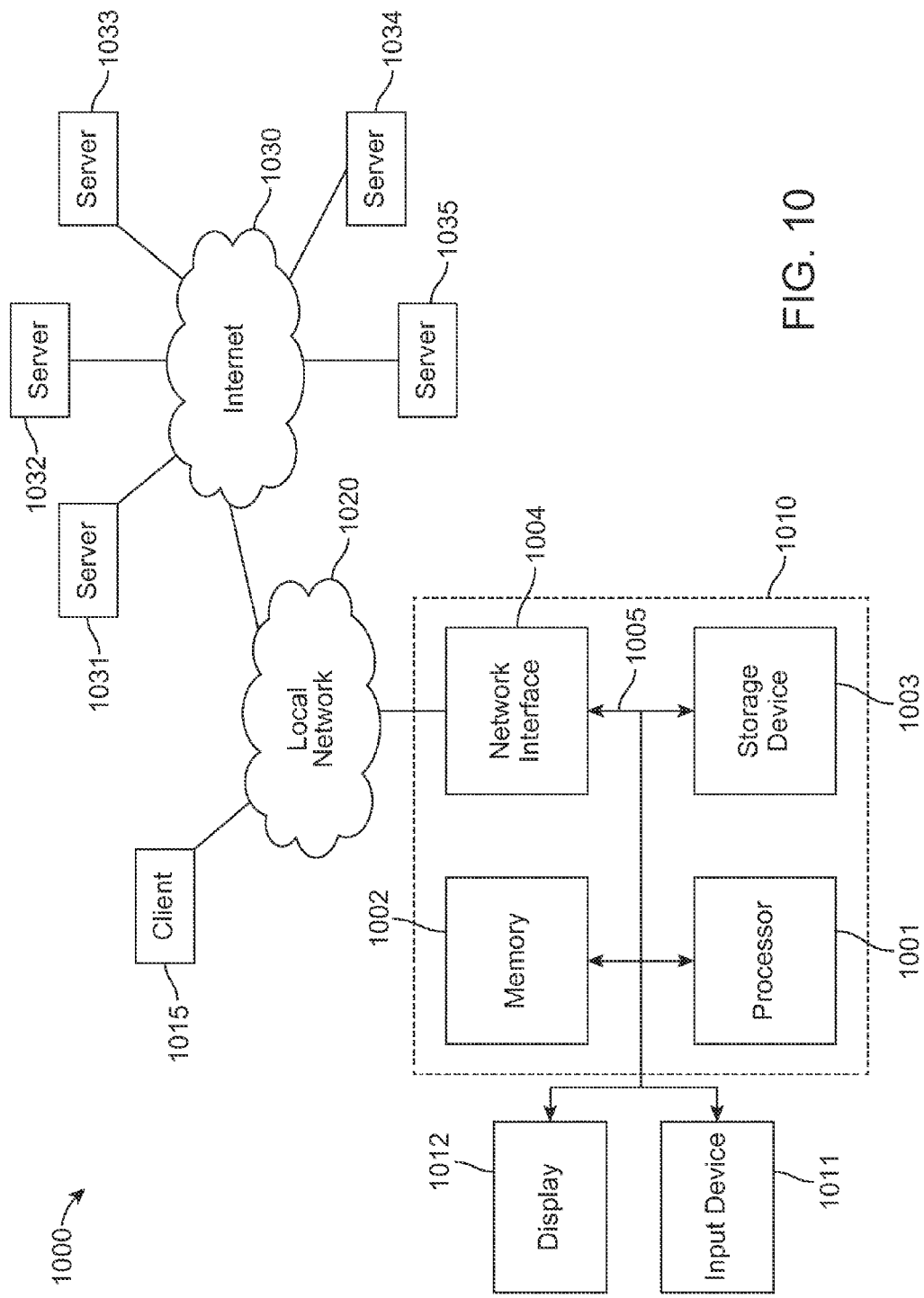
FIG. 10 illustrates an example of a computer system.

An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed:

1. A computer-implemented method comprising: causing an engine to receive a first process version comprising an instance hierarchy comprising a plurality of nodes referencing objects of an object pool; causing the engine to create a copy of at least a portion of the instance hierarchy; causing the engine to create a copy of at least one object of the object pool; causing the engine to create a modified object from the copy of the at least one object of the object pool; and causing the engine to modify the portion of the instance hierarchy to reference the modified object and create a second process version.

2. A method as in claim 1 wherein the nodes of the instance hierarchy are arranged in a parent-child relationship, and copying of the instance hierarchy preserves the parent-child relationship.

3. A method as in claim 1 wherein at least one node of the first process version, and at least one node of the second process version, reference a global object of the object pool.

4. A method as in claim 1 wherein the first process version comprises an archive version including an archive table, and copying of the instance hierarchy creates additional entries in the archive table and creates an origin matrix.

5. A method as in claim 1 further comprising causing the engine to delete a node from the copy of the instance hierarchy.

6. A method as in claim 1 wherein the instance hierarchy comprises a tree structure.

7. A non-transitory computer readable storage medium embodying a computer program for performing a method, said method comprising: causing an engine to receive a first process version comprising an instance hierarchy comprising a plurality of nodes referencing objects of an object pool; causing the engine to create a copy of at least a portion of the instance hierarchy; causing the engine to create a copy of at least one object of the object pool; causing the engine to create a modified object from the copy of the at least one object of the object pool; and causing the engine to modify the portion of the instance hierarchy to reference the modified object and create a second process version.

8. A non-transitory computer readable storage medium as in claim 7 wherein the nodes of the instance hierarchy are arranged in a parent-child relationship, and copying of the instance hierarchy preserves the parent-child relationship.

9. A non-transitory computer readable storage medium as in claim 7 wherein at least one node of the first process version, and at least one node of the second process version, reference a global object of the object pool.

10. A non-transitory computer readable storage medium as in claim 7 wherein the first process version comprises an archive version including an archive table, and copying of the instance hierarchy creates additional entries in the archive table and creates an origin matrix.

11. A non-transitory computer readable storage medium as in claim 7 wherein the method further comprises causing the engine to delete a node from the copy of the instance hierarchy.

12. A non-transitory computer readable storage medium as in claim 7 wherein the instance hierarchy comprises a tree structure.

13. A computer system comprising: one or more processors; a software program, executable on said computer system, the software program configured to: cause an engine to receive a first process version comprising an instance hierarchy comprising a plurality of nodes referencing objects of an object pool; cause the engine to create a copy of at least a portion of the instance hierarchy; cause the engine to create a copy of at least one object of the object pool; causing the engine to create a modified object from the copy of the at least one object of the object pool; and cause the engine to modify the portion of the instance hierarchy to reference the modified object and create a second process version.

14. A computer system as in claim 13 wherein the nodes of the instance hierarchy are arranged in a parent-child relationship, and copying of the instance hierarchy preserves the parent-child relationship.

15. A computer system as in claim 13 wherein at least one node of the first process version, and at least one node of the second process version, reference a global object of the object pool.

16. A computer system as in claim 13 wherein the first process version comprises an archive version including an archive table, and copying of the instance hierarchy creates additional entries in the archive table and creates an origin matrix.

17. A computer system as in claim 13 wherein the software program is further configured to cause the engine to delete a node from the copy of the instance hierarchy.

18. A computer system as in claim 13 wherein the instance hierarchy comprises a tree structure.

* * * * *